United States Patent [19]

Foster et al.

[11] Patent Number: 5,452,807
[45] Date of Patent: Sep. 26, 1995

[54] ACCESSORIES FOR PIVOTED POWER COLUMN

[75] Inventors: L. Dale Foster, Brookville, Ind.;
Timothy A. Kappers, Cincinnati, Ohio;
Cecil R. Lohrey, Brookville, Ind.

[73] Assignee: Hill-Rom Company, Inc., Batesville, Ind.

[21] Appl. No.: 107,528

[22] Filed: Aug. 17, 1993

Related U.S. Application Data

[63] Continuation-in-part of Ser. No. 995,207, Dec. 22, 1992, Pat. No. 5,284,255, which is a continuation of Ser. No. 743,215, Aug. 9, 1991, Pat. No. 5,186,337.

[51] Int. Cl.[6] .................................................. A47F 7/00
[52] U.S. Cl. ............................ 211/26; 211/168; 248/131
[58] Field of Search ....................... 211/26, 88, 168, 211/190; 248/131, 145, 289.1; 128/205.26, 897; 600/22, 21; 5/658, 503.1; 137/561 A; 361/334; 174/48

[56] References Cited

U.S. PATENT DOCUMENTS

| | | |
|---|---|---|
| 3,550,892 | 12/1970 | Probst . |
| 4,714,222 | 12/1987 | Kiesel et al. . |
| 4,750,474 | 6/1988 | Dukhan et al. ............................ 600/22 |
| 4,795,122 | 1/1989 | Petre . |
| 4,809,677 | 3/1989 | Mackin et al. ............................ 600/22 |
| 5,072,906 | 12/1991 | Foster . |
| 5,186,337 | 2/1993 | Foster et al. . |
| 5,284,255 | 2/1994 | Foster et al. . |

Primary Examiner—Blair M. Johnson
Attorney, Agent, or Firm—Wood, Herron & Evans

[57] ABSTRACT

A power column is a hollow post having six vertical walls and is mounted between horizontal arms pivoted to the floor and ceiling respectively. The pivotal axis for the arms passes through the head end of a hospital bed, enabling the power column to swing from one side of the bed to the other. The electrical outlets are on two walls separated by a front wall so that one or the other of the walls is easily accessible whether the power column is on either side of the bed. Lateral horizontal rails are pivotably mounted on either side of the column. The height of the rails is adjustable. The rails contain one or more gas outlets which are laterally adjustable on the rail and can carry other accessories that are laterally adjustable. The other accessories which can be mounted on the rail include a shelf and a saddle basket each of which are clipped onto the rail and mounted in a cantilever manner. Additionally, a storage basket can be suspended from the rail and clipped to the underside thereof. The position of the rail is adjustable and a knuckle-type joint connecting the rail to a pole mounted on either side of the column has a groove into which the hose for feeding the gas outlet is seated. The knuckle joint permits the hose to pay in and out as the rail and attached gas outlet are re-positioned. The pole is mounted for both pivotal and vertical movement relative to the column.

8 Claims, 11 Drawing Sheets

ACCESSORIES FOR PIVOTED POWER COLUMN

RELATED APPLICATIONS

This application is a continuation in part of application Ser. No. 07/995,207 filed Dec. 22, 1992, U.S. Pat. No. 5,284,255, which is a continuation of application Ser. No. 07/743,215 filed Aug. 9, 1991, U.S. Pat. No. 5,186,337.

BACKGROUND OF THE INVENTION

This invention relates to a power column, and more particularly, the invention relates to accessories for a pivotable power column for use with a hospital bed.

A power column generally is disclosed in U.S. Pat. No. 4,523,683 and is fixedly mounted between the floor and ceiling of a hospital room. The column is of rectangular cross section. A bed is positioned with its head end adjacent to the power column and with the bed being positioned at an angle with respect to the power column that is most convenient for the attending nurse and for providing physiological services for the patient. The power column has mounted in its front face plural gas outlets, that is, outlets for oxygen, purified air, nitrous oxide and vacuum. Alongside walls of the power column are electrical outlets. There is provision for normal 110 volt power, emergency power, low voltage communication circuits and low voltage monitoring circuits. A monitor with visual display is mounted on an arm at the front wall of the power column, the arm permitting the monitor to tilt and swivel. Vertical mounting rails are provided to mount a wide variety of accessories such as sphygmomanometer, drainage bag, IV pole, stat clock timer for code blue situations, lamps, storage baskets, etc.

The power column is for critical care patients. The objective has been to make all of the equipment and accessories associated with the treatment of the patient as accessible as possible while providing as much freedom of movement as possible around the bed so as to permit the nurse to attend the patient, even in code situations.

An improvement in the mounting of the power column for pivoting movement around the head end of the bed is disclosed in application Ser. No. 07/525,044, also assigned to the assignee of this invention. More specifically, there are disclosed support arms pivoted to the floor and ceiling, respectively, on an axis that passes through the head end of the bed. The power column is mounted between the free ends of those arms, thereby permitting the power column to swing to either corner at the head end of the bed so as to be positionable on either the right or left side of the bed. The pivoting power column increases the flexibility of bringing services to the patient on the side of the patient where they are needed or, alternatively, making the equipment optimally accessible to the nurse, with the nurse having the choice of having the equipment on her left or her right hand. The pivoting power column also frees space at the head end of the bed for procedures requiring the nurse to access the patient from the head end of the bed.

BRIEF SUMMARY OF THE INVENTION

It has been an objective of the present invention to provide accessories for a power column that improve upon the power column of the co-pending application Ser. No. 07/995,207 and to provide a power column providing optimal access to the patient with equipment that is more easily reached by the nurse, the power column having greater flexibility in positioning and moving equipment to meet specific needs of the patient.

The objective of the invention is attained by providing a power column having two substantially identical electrical outlet walls lying in planes that are about 90 degrees to each other and preferably separated by a front wall. The power column is enclosed by parallel side walls and a back wall so that preferably it is six-sided in cross section.

The pair of electrical outlet walls that are at right angles to each other permit the power column to present to the attending nurse an outlet wall that is perpendicular to the side of the bed regardless of the side of the bed to which the power column has been pivoted. Thus, the electrical outlets are optimally accessible.

The power column is provided with a pole on each side of the power column. The pole contains a rotatable vertical rail. Laterally projecting, horizontal gas rails can be mounted in any vertical position on the pole so that the gas rails are thus vertically adjustable and pivotable toward or away from the attending nurse. Gas outlets are mounted on each gas rail to be horizontally positionable for optimum access. Accessories such as drainage bags, vaporizer bottles, or the like can be mounted on the gas rails.

The rear wall of the power column preferably has seven horizontal rows of hookup outlets. The top three and bottom three rows are preferably oxygen, purified air and vacuum, respectively, and the middle row is nitrous oxide.

Within the column are two vertical, hollow extrusions mounted on the opposing side walls. Each hollow extrusion has two passageways, thus providing a total of four passageways for the four gases. Each extrusion has a vertical rib with bores angled through the rib to respective tubes, thereby providing vertically-spaced and alternating ports for the two gases supplied through the extrusion. Each port is connected to a horizontal tube having the four hookup outlets that project through the back wall of the column. Flexible hoses connect the hookup ports to the gas outlets that can be snap-fitted on horizontal gas rails generally of the type disclosed in U.S. Pat. No. 4,646,211 which is incorporated herein by reference.

Within the power column are four raceways for any combination of four electrical circuits, for example: Normal 110 volts, emergency power, communication low voltage, and monitoring low voltage.

Each side wall has two vertical channels suitable for mounting various types of accessories using mounting of the type disclosed in U.S. Pat. No. 4,523,683 which is incorporated herein by reference.

A further feature of the invention resides in the provisions of a monitor mounting arm and monitor combination providing a variety of monitor movements: vertical tilting through about 12" to raise and lower the monitor; swiveling about its own axis; swinging on the arm through about 220 degrees; tilting on its own axis through an arc of up to about 15 degrees.

The combined effects of the structural features of the invention greatly improve the accessibility and flexibility of the pivoting power column. The electrical outlets are more accessible. The gas outlets are not only more accessible, but are adjustable vertically, laterally, and pivotally. The monitor is more completely adjustable with respect to the power column. These features obtain even if the power column's ability to swing through about 120 degrees around the end of the bed, the combination enables the nurse to put the monitor in the most desirable position. The cross section of the power column is, per se, small, being approximately 11×13½" in its preferred form. This is significantly smaller than the fixed power column of U.S. Pat. No. 4,523,683 and thus permits greater access to the patient around the head end of the bed.

The invention further includes three different accessories which can be removably mounted on the gas rails. The first accessory is a generally planar horizontal shelf which has a bracket on the underside thereof. The bracket snap-fits over a lip projecting from the upper side of the gas rail. The shelf can be used to support a variety of other accessories or instruments used by a care provider when administering to a patient on the hospital bed.

The second and third accessories of this invention, which can be releasably attached to the gas rail, are baskets for conveniently storing accessories or instruments used by the care provider. The first basket includes a pair of arms extending horizontally from the upper edge of the basket. This so-called saddle basket has an open top for access to the items contained in the basket. Hooks are included on the terminal end of each arm for securing the basket in a cantilever manner to the lip on the upper side of the gas rail.

The second basket is suspended from the underside of the gas rail and has an open end for access to items in the basket. Clips are provided on the underside of the gas rail for securing the suspended basket thereto. The upper edge of the basket is removably snap-fitted into the clips.

Another feature of this invention resides in the provision of a knuckle-type joint connecting the gas rail to the vertical pole on the power column. The knuckle joint includes a groove into which one of the flexible hoses connecting the gas ports in the power column to the gas outlets on the gas rail is fed. The hose is seated within the groove in the knuckle joint to enable the gas rail to be pivoted or translated vertically with respect to the power column without pinching or crimping the hose thereby restricting the flow of gas to the outlets. The hose pays out within the groove as the gas rail is repositioned relative to the power column.

Yet another feature of the invention is the mounting of an elongated, generally vertical pole along the power column. The pole enables equipment such as the gas rails and attached accessories to be pivotally mounted to the power column. The top and bottom ends of the pole are seated in sockets in upper and lower mounts, respectively. The mounts are screwed or otherwise secured to inserts slidably retained within a pair of vertical rails in the side and back walls of the power column. The insert includes a mounting screw hole for receiving a screw to secure the mount to the power column. The pole has circular ends which pivot within the sockets of the mounts secured to the power column. As a result, the gas rail can be pivoted relative to the power column along with the pole.

BRIEF DESCRIPTION OF THE DRAWINGS

The several features of the invention will become more readily apparent from the following detailed description taken in conjunction with the accompanying drawings in which.

DETAILED DESCRIPTION OF THE INVENTION

Figure 1:
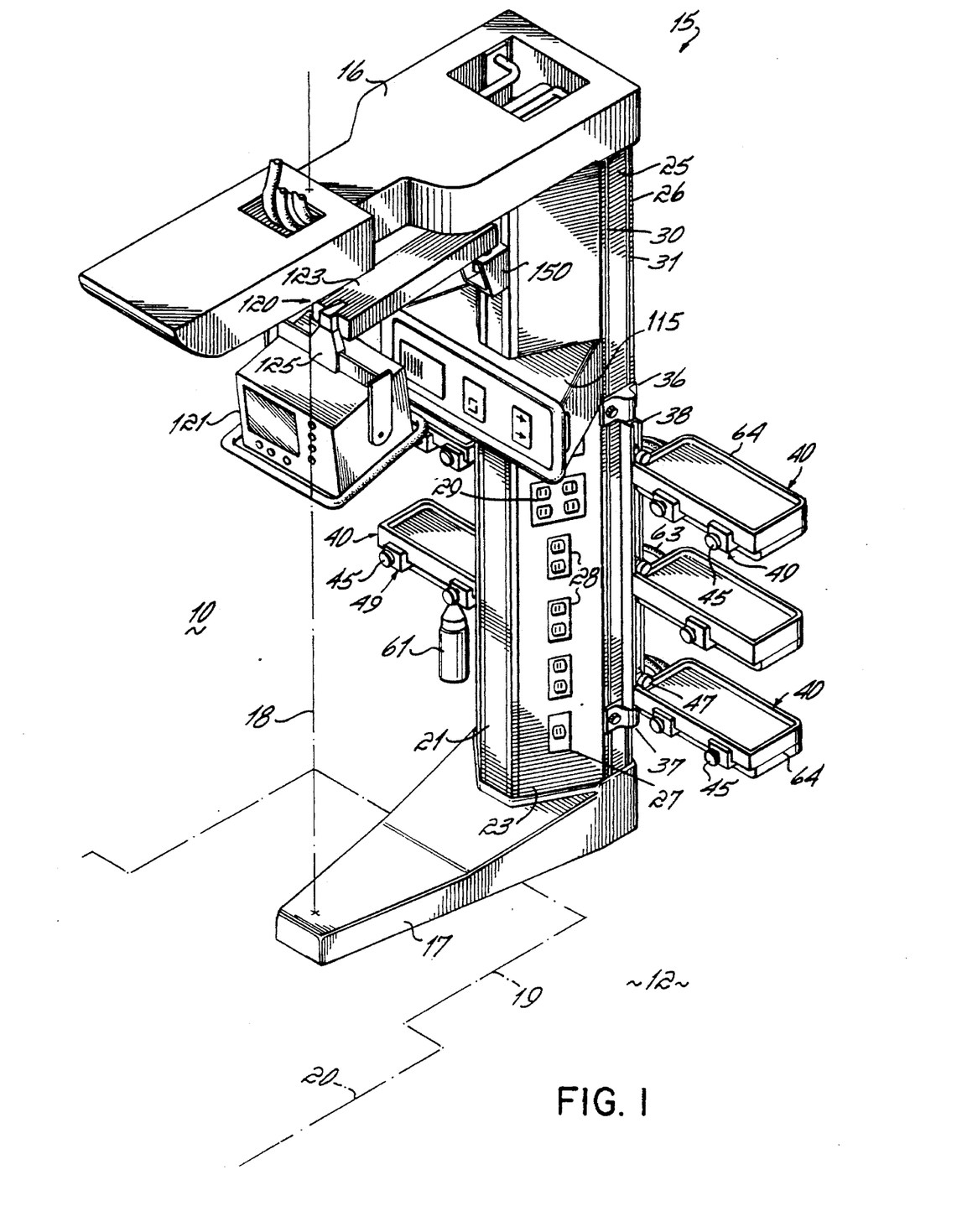
FIG. 1 is a perspective view of the invention.
Figure 3:
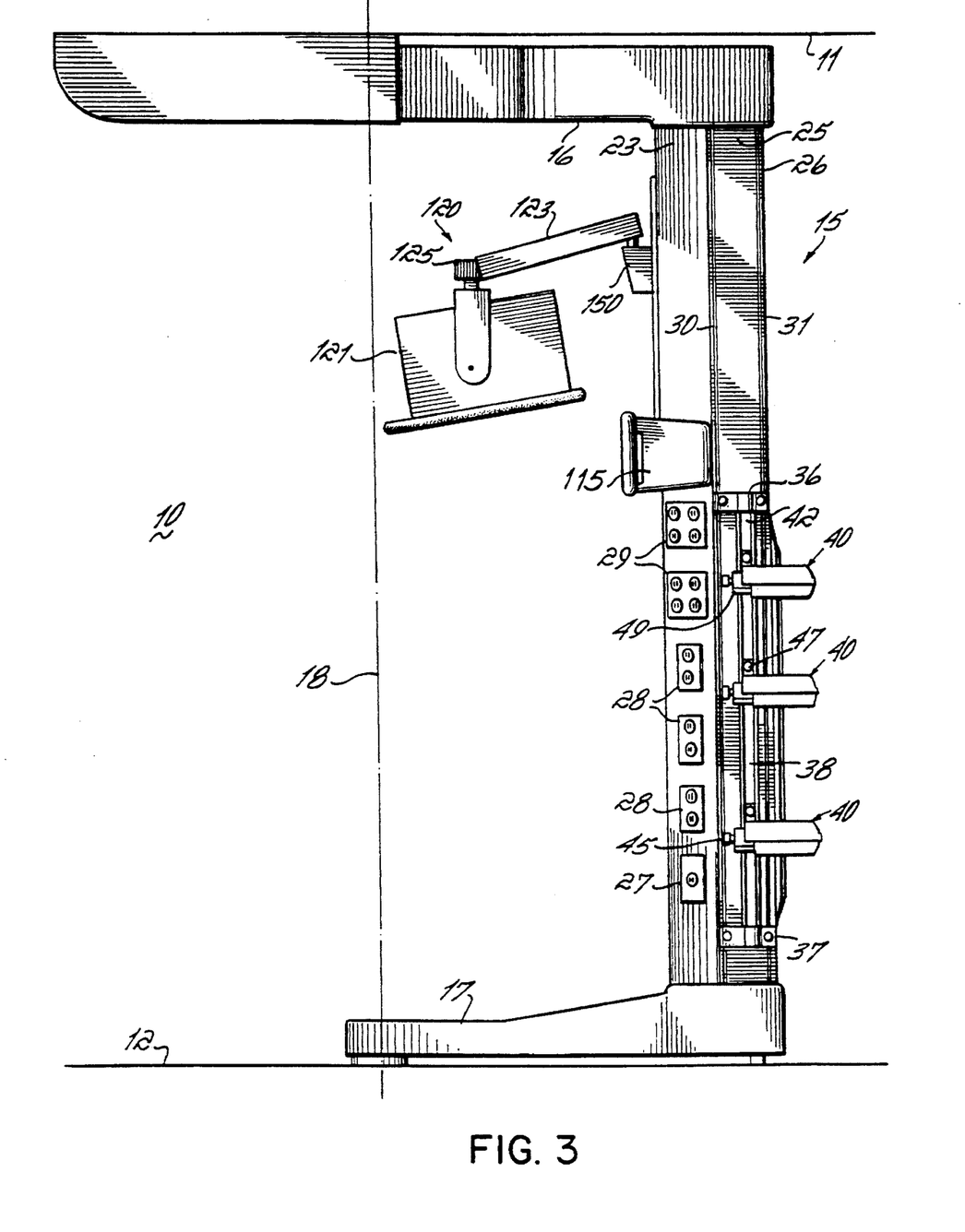
FIG. 3 is a side elevational view of the invention.

Referring to FIG. 1, there is shown a hospital room 10 having a ceiling 11 (FIG. 3) and a floor 12. A power column 15 in accordance with the present invention is mounted between an upper arm 16 and a lower arm 17. The upper arm 16 is pivotably mounted to the ceiling 11 and the lower arm 17 is pivotably mounted on the floor 12. A single pivotal axis 18 for the arms passes through the head end 19 of a bed 20 shown in outline form in FIG. 1.

Figure 2:
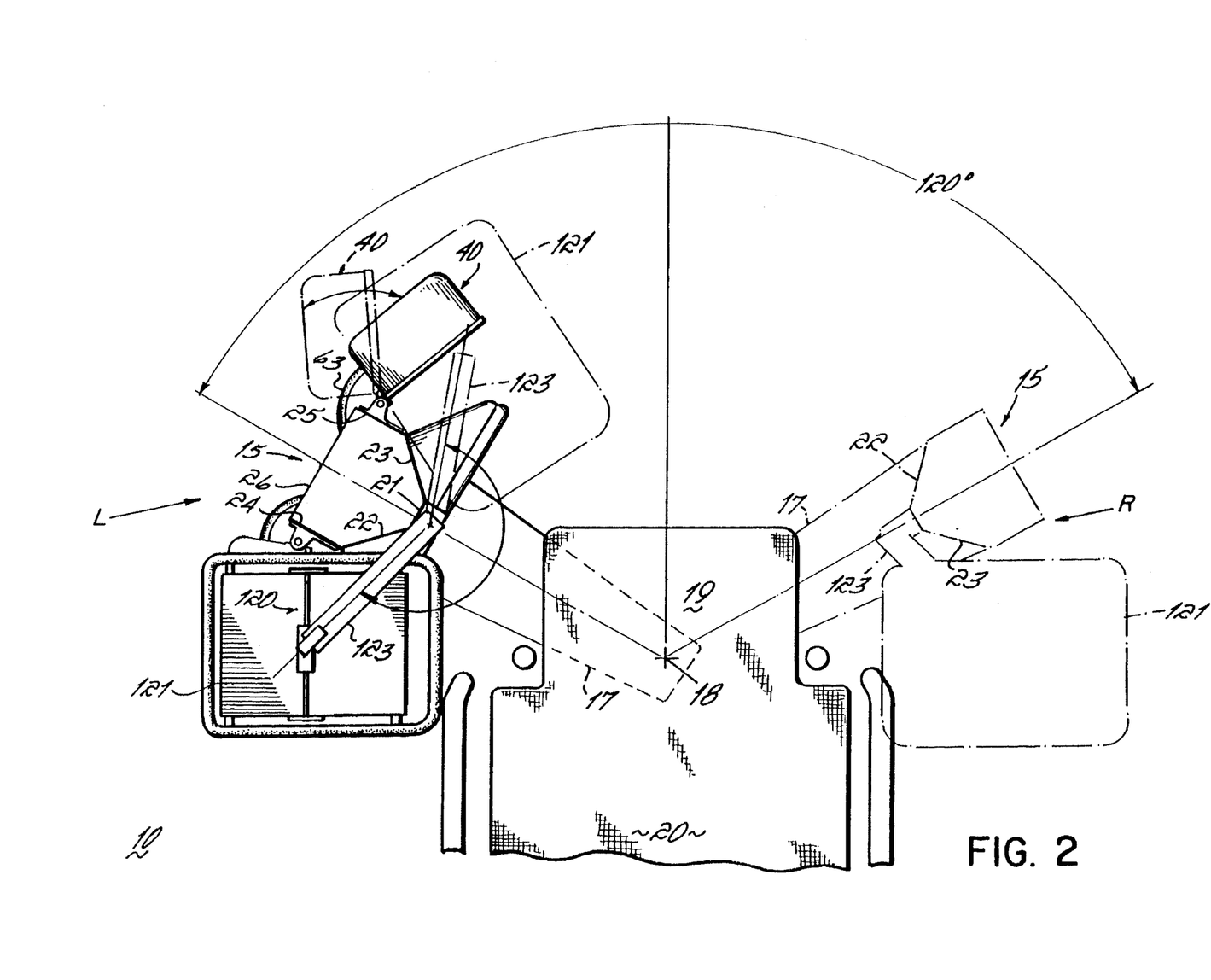
FIG. 2 is a diagrammatic plan view of the outline of the invention in conjunction with a hospital bed.

As best shown in FIG. 2, the power column 15 can be swung through an arc of about 120 degrees so that in one position R at the right side of the bed the power column is at the right corner of the bed, and in alternate position L, the power column is at the left side of the bed. The power column can be at any place in between the positions R and L, but it is believed that the positions R and L are the most desirable from the standpoint of accessibility of the equipment to the nurse.

Figure 4:
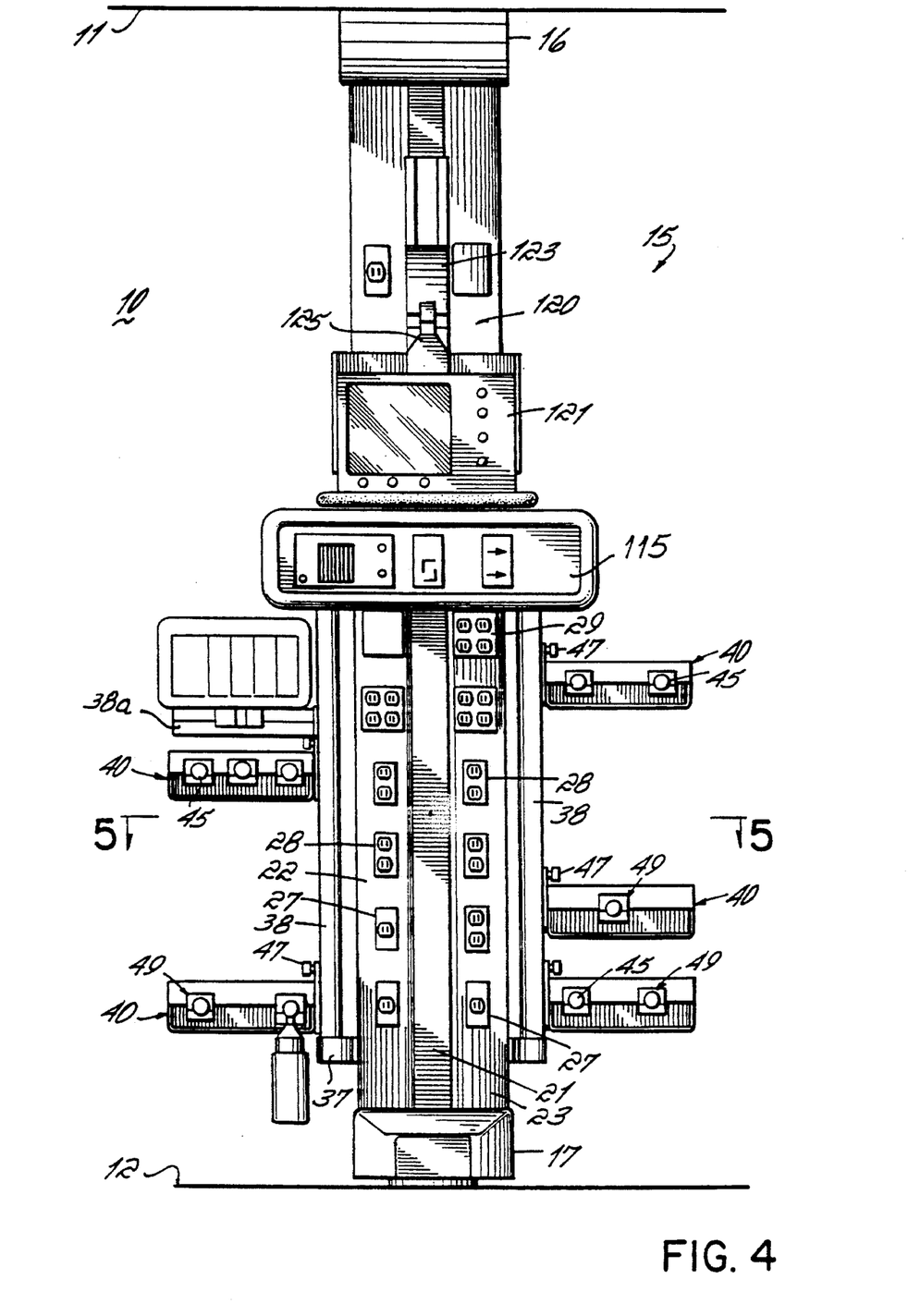
FIG. 4 is a front elevational view of the invention.
Figure 5:
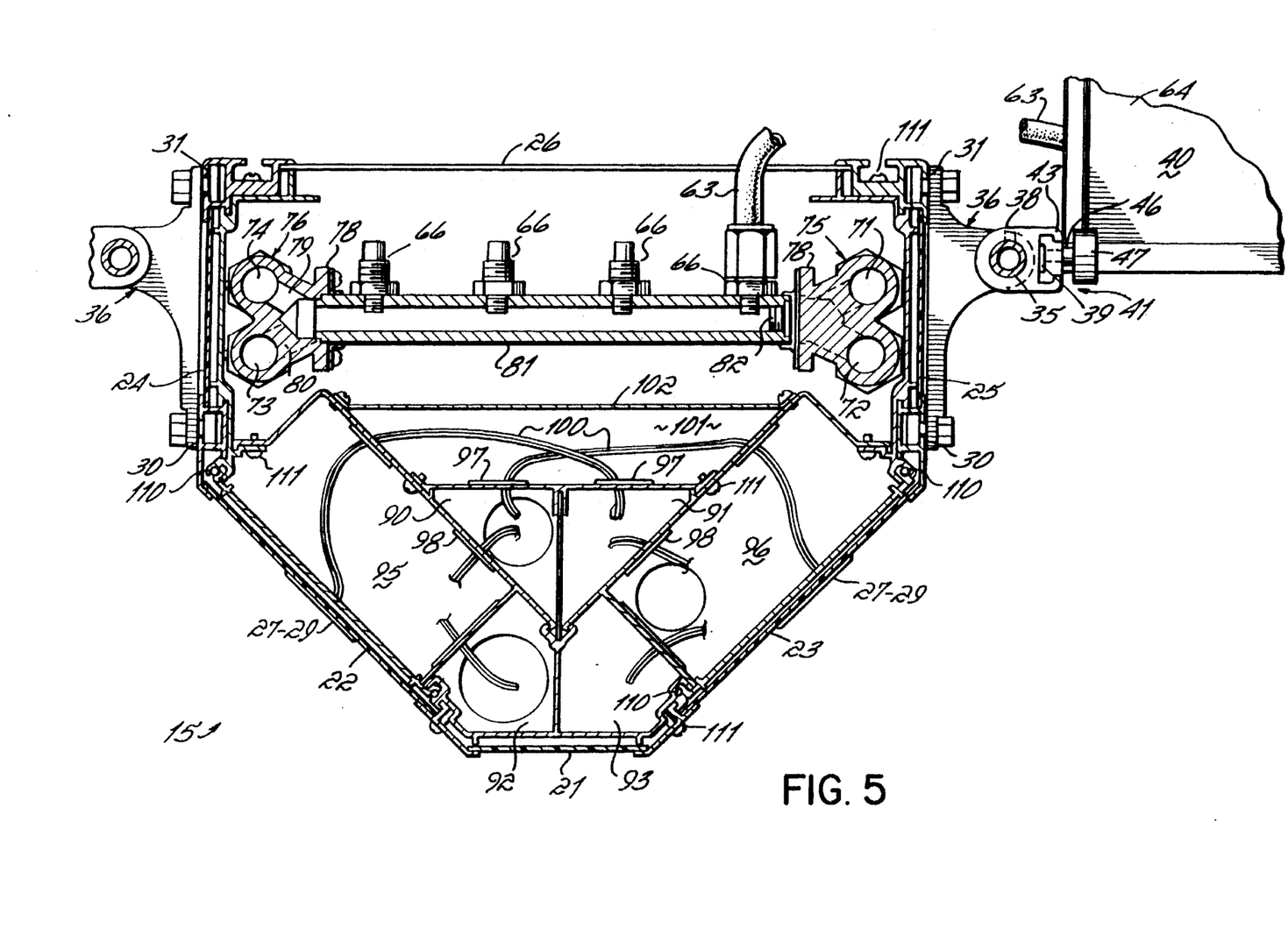
FIG. 5 is a cross-sectional view of the power column taken along lines 5—5 of FIG. 4.

As shown in FIGS. 2 and 5, the power column preferably has six walls. A front wall 21 is connected to two electrical outlet walls 22 and 23. The outlet walls 22 and 23 are each angled at about 45 degrees to the front wall and 90 degrees to each other. Opposed parallel side walls 25, 25 are connected to the outlet walls. A back wall 26 encloses the power column. As shown in FIGS. 1 and 4, the outlet walls 22 and 23 have a plurality of electrical outlets or receptacles mounted on the walls. These are simplex outlets 23, duplex outlets 28 or two-gang duplex outlets 29. By referring to FIG. 2, it can be seen that when the power column is in the R position, the outlets on the wall 23 are easily accessible to the nurse with the wall being approximately perpendicular to the side of the bed. When the power column 15 is in the L position, the outlets on the wall 22 are accessible with the wall 22 being perpendicular to the side of the bed. The connections to the outlets, principally normal power and emergency power, are substantially duplicated on each wall.

Figure 6:
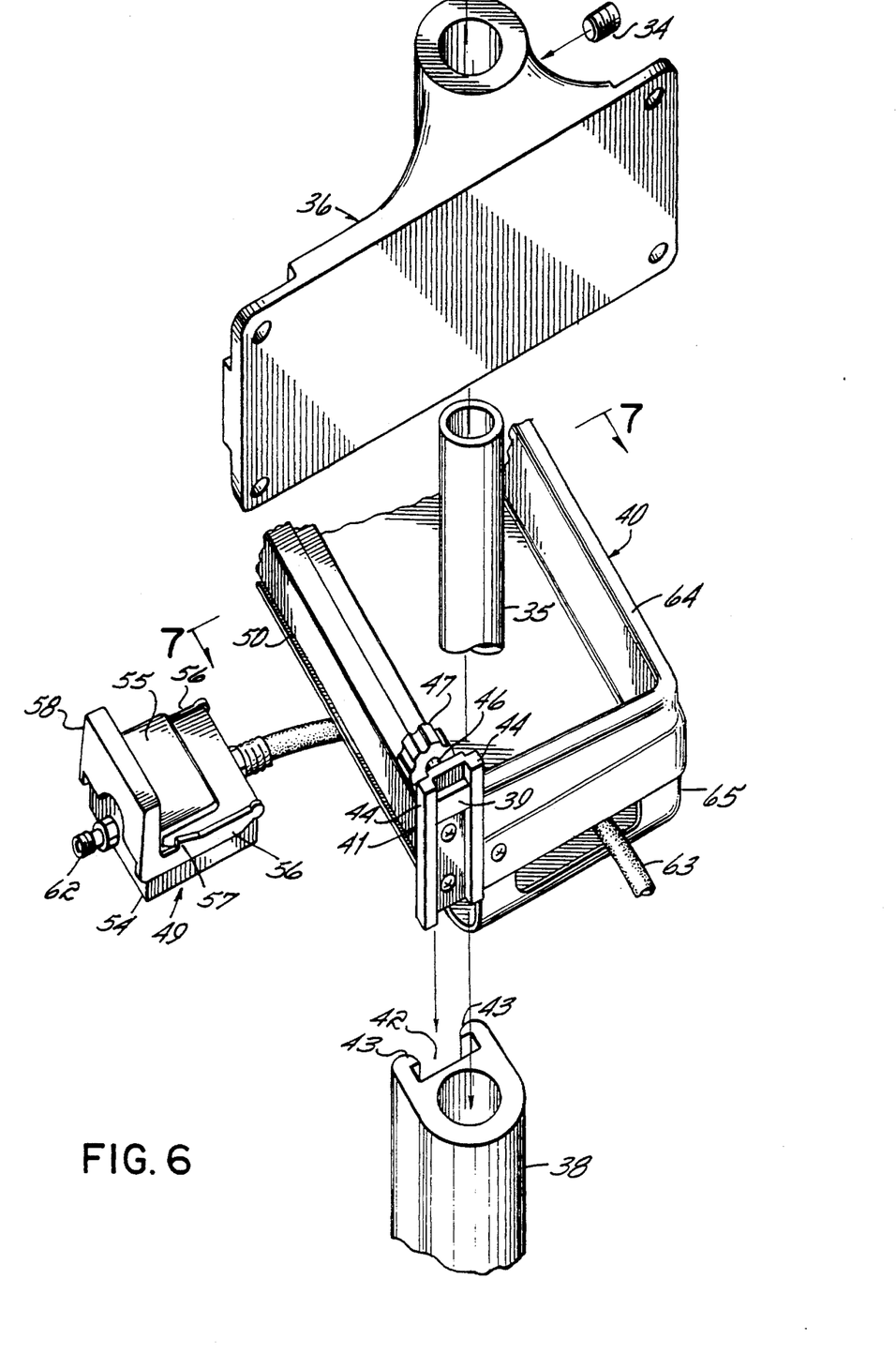
FIG. 6 is a disassembled perspective view of the gas rail mount of the present invention.

As best shown in FIGS. 1, 5, and 6, each side wall 24, 25 has a vertical front rail 30 and a vertical rear rail 31. The rails are employed principally for the mounting of accessories and gas outlets 45. A vertical pole 35 is mounted by upper and lower fixtures 36 to the vertical rails 30 and 31 on each side of the power column. Each pole 35 is fixed by a set screw 34 in its fixtures 36. Each pole 35 has a vertical rail 38 which is rotatable around the pole 35. A plurality of horizontal gas rails 40 are fixed to the vertical rail 38 on the pole 35 by means of a releasable fixture 41. Accessory rails 38(a) for other equipment can be mounted on vertical rail 38.

The rotatable rail 38 has a channel 42 defined in part by spaced apart lips 43. The fixture 41 has two spaced flanges 44 which underlie the lips 43 when the fixture 41 is slid into the channel 42. A clamping block 39 is mounted on a screw 46 threaded into the fixture 41. A knob 47 fixed to this screw 46 permits the screw 46 to be rotated in the fixture 41 to cause the clamping block 39 to be pressed against the bottom of the channel 42 in order to fix the fixture 41 and the accessory that it carries in any selected vertical position on the rail 38. Each fixture 41 permits the associated gas rail 40 to be vertically adjusted to any position on the pole 35.

Figure 7:
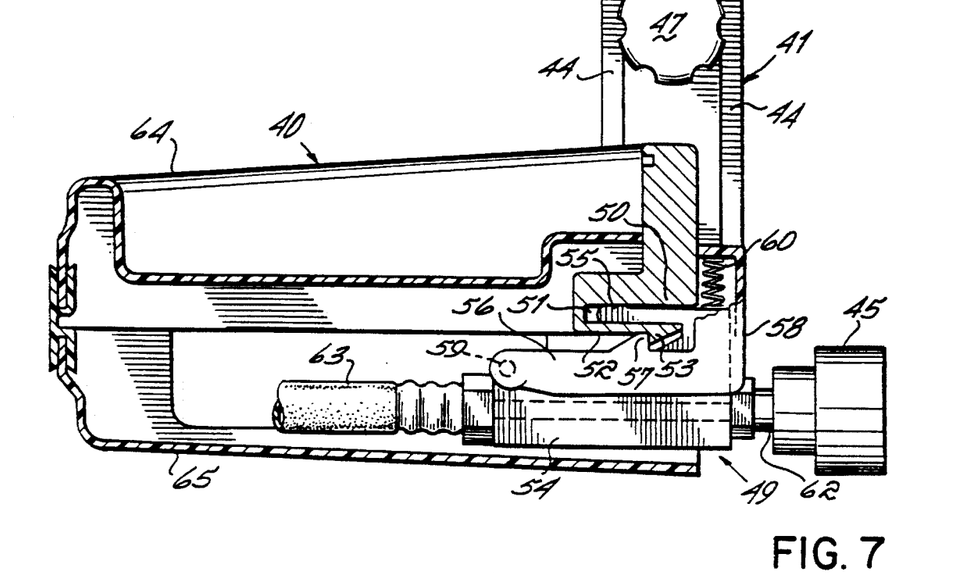
FIG. 7 is a cross-sectional view of the gas rail taken along lines 7—7 of FIG. 6.

As shown in FIGS. 6 and 7, the gas rail 40 is generally of the type disclosed in U.S. Pat. No. 4,646,211 and has a snap-in channel 50 adapted to receive a releasable mounting fixture 49.

The snap-in channel 50 has a horizontal groove 51 defined on the lower side of the groove by a horizontal rib 52. The rib 52 has a downwardly-depending lip 53.

Each fixture 49 is in the form of a block 54 having an upper tongue 55 that is projectable into the groove 51. A plastic fastener 58 is pivotally mounted at 59 to the block 54. The fastener has arms 56 which have upwardly projecting lugs 57 that snap in behind downwardly-depending lip 53 and hold the block in position with the tongue 55 in the groove 51. A pair of compression springs 60 urge the arms upwardly to hold the lug 57 in position behind the rib.

The mounting fixture 49 is suitable for mounting accessories 61 such as a drainage bottle or a vaporizing bottle. Each gas rail 40 is about 18" long and the fixture 49 can be mounted at any position along the rail, thereby avoiding interference among various items of equipment.

Figure 10:
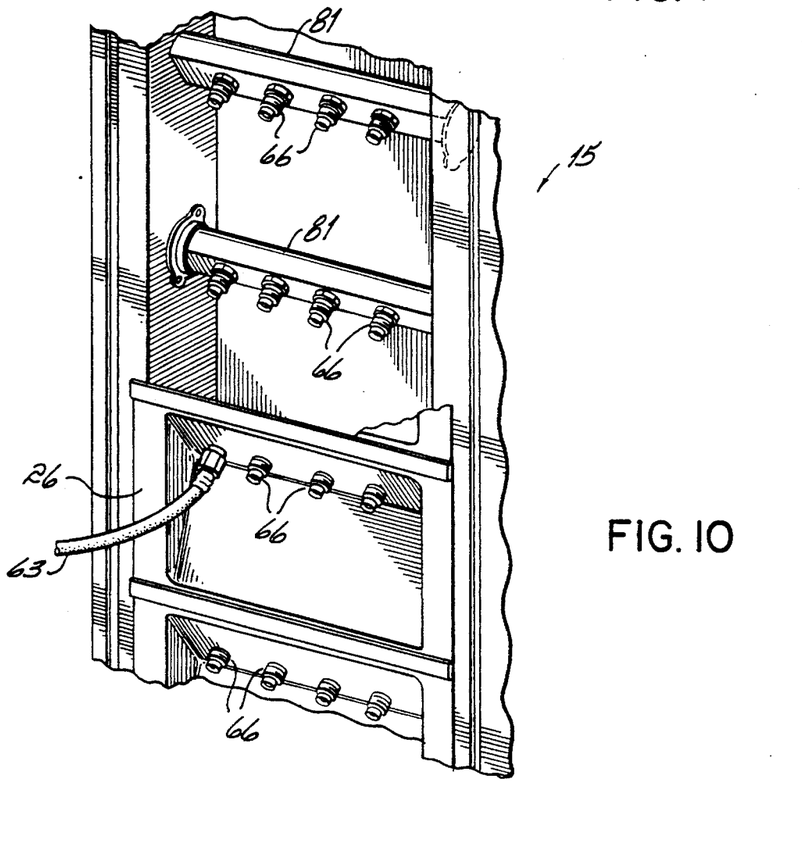
FIG. 10 is a fragmentary perspective view of the back of the power column showing the gas hookups.

Gas outlets 45 are also removably mounted on the rails by fixtures 49. When the fixture 49 is employed as a gas outlet, it has a bore extending through it. At one end of the bore is a nipple 62 which is threaded to receive gas outlet 45 that is threaded to it. The other side of the bore has a threaded nipple that receives the end of a hose 63. Each outlet 45 is connected by the hose 63 to a hook-up outlet 66 projecting through a triangular access in the back wall 26 of the power column 15 (FIG. 10). The hose 63 preferably lies in a housing 64 attached to the gas rail. The housing has a hinged lid 65 permitting access to the hoses 63.

Four types of gases are available, namely, oxygen, purified air, vacuum, and nitrous oxide. Those gases are supplied through four tubes 71, 72, 73 and 74 (FIG. 5). Tubes 71 and 72 form part of an integral vertical extrusion 75 on one side of the power column and tubes 73 and 74 form part of an integral extrusion 76 on the other side of the power column. The two extrusions 75, 76 extend vertically down the respective side walls 24 and 25 within the interior of the power column. Each extrusion has a vertical rib 78. Spaced down the length of each extrusion are alternating bores 79 and 80 extending through the rib 78 into respective tubes 73 and 74. Each bore 79, 80 is connected to a respective horizontal manifold bar 81 having four hook-up outlets 66 projecting from it. The bar 81 is cantilevered from its respective extrusion 76 and is capped at its free end 82. The hook-up outlets 66 project through the back wall 26 as shown in FIG. 20 so as to be easily accessible for connection to a hose 63 leading to the gas outlet 45.

There are, uniformly spaced down the power column, seven manifold bars 81 each delivering the one gas to which it is connected. As stated above, the first three bars are connected to oxygen, pure air and vacuum. The same is true for the bottom three bars. The middle bar is connected to nitrous oxide.

From the foregoing, it can be seen that the nurse can mount one or more gas rails 40 vertically spaced in any position along the vertical rails 38 at either side of the power column. The gas outlet 45 mounted on the gas rail is connected to the desired hook-up port 66 through the flexible hose 63, Preferably, the outlets 45 are color coded. The vertical position of the gas rail 40 can be adjusted and the gas rails can be pivoted closer to or farther away from the nurse working alongside the bed 20.

Within the power column 15 are four vertical raceways for electrical circuits or conductors (FIG. 5). Two triangular raceways 90 and 92 carry electrical conductors. The conductors in raceway 90 are connected to normal 100 volt power while raceway 91 carries conductors connected to emergency power. Raceways 92 and 93 carry low voltage communication circuits and low voltage monitoring circuits or other electrical type, respectively.

The walls 22 and 23 partly enclose housings 95 and 96 respectively, The outlets 27–29 mounted on the walls 22, 23 project into those housings. Knockouts 97 on the triangular raceways 90, 91 and knockouts 98 on the housings 95, 96 permit conductors 100 from the normal voltage and the emergency power to cross over to the remote housings 95, 96 but are directly connected to the outlets in the adjacent housings through knockouts 98. A third raceway 101 having the crossover conductors 100 is formed by a sheet metal wall 102 which is secured by screws to the back walls of housing 95, 96. The wall 102 separates the gas hook-up ports 66 from the electrical conductors 100 for safety reasons. Thus it is that substantially identical connections can be made to the outlets on both walls 22, 23 so that regardless of the left or right position of the power column, the nurse will have access to substantially the same electrical power outlets.

All of the walls forming the outside walls of the power column 15 and the internal housing and raceway walls are formed of the extrusions depicted in FIG. 5. Certain of the extrusions are interconnected by a ⅛" wire 100 threaded down a hole formed by adjoining grooves in two wall elements to be joined together. Other wall elements are joined by screws as, for example, in the positions 111.

Another useful feature of the invention consists of the mounting of an electronics module 115 (FIGS. 1, 3 and 4) on the front of the power column about 4½ feet off the floor. It provides a location for the critical controls, i.e., stat clock, code blue switch, nurse call, etc. With the power column in any position, the nurse is able to reach these critical controls from either side of the bed.

Another feature of the invention consists of a mounting 120 of a monitor 121 (FIG. 1) so that it is easily viewed by the attending nurse and is easily moved to the position most desired by the attending nurse. The monitor 121, which may something of the order of 60 lbs., is supported on arm 123 (FIGS. 8 and 9) obtained from Fohrsight Co. of Clacamus, Oreg. The arm 123 is pivoted at 124 on a horizontal axis for swinging up and down through an angle of about 15°. The monitor 121 is carried by a bracket 125 which is pivoted at 126 on a horizontal axis on the other end of the arm 123.

Figure 8:
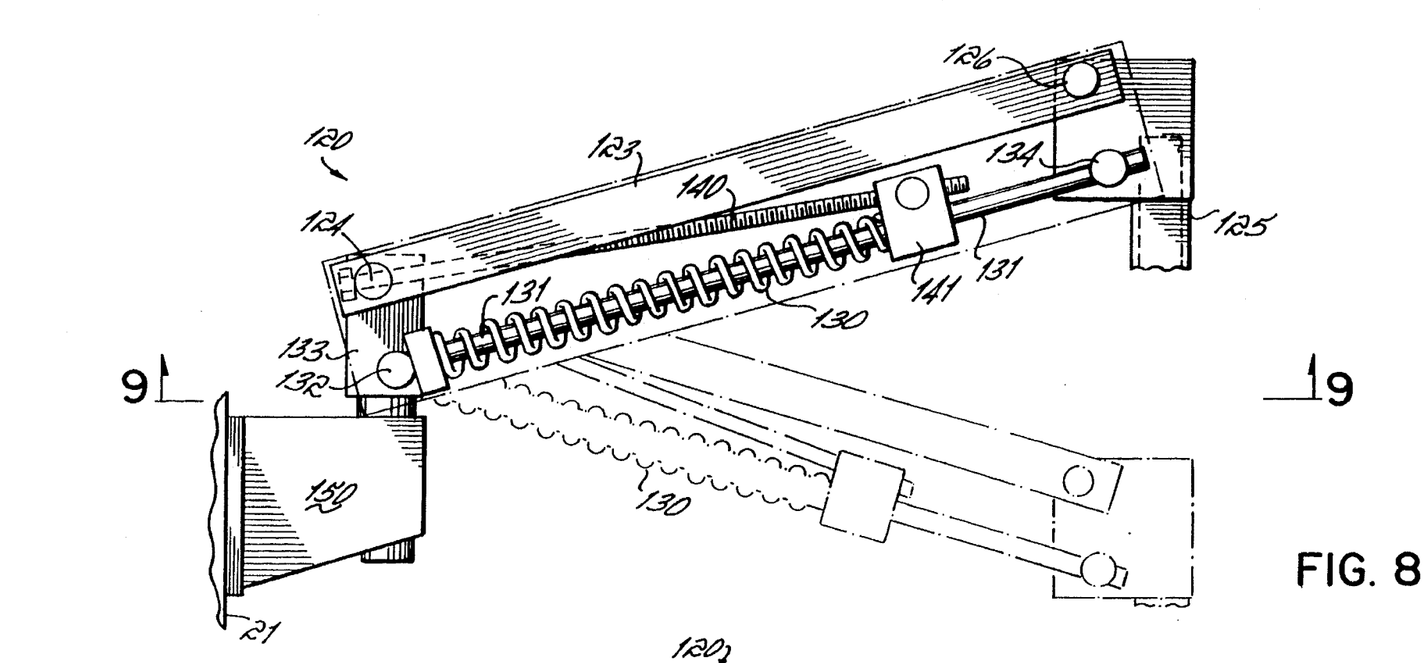
FIG. 8 is an elevational view of a monitor mount.
Figure 9:
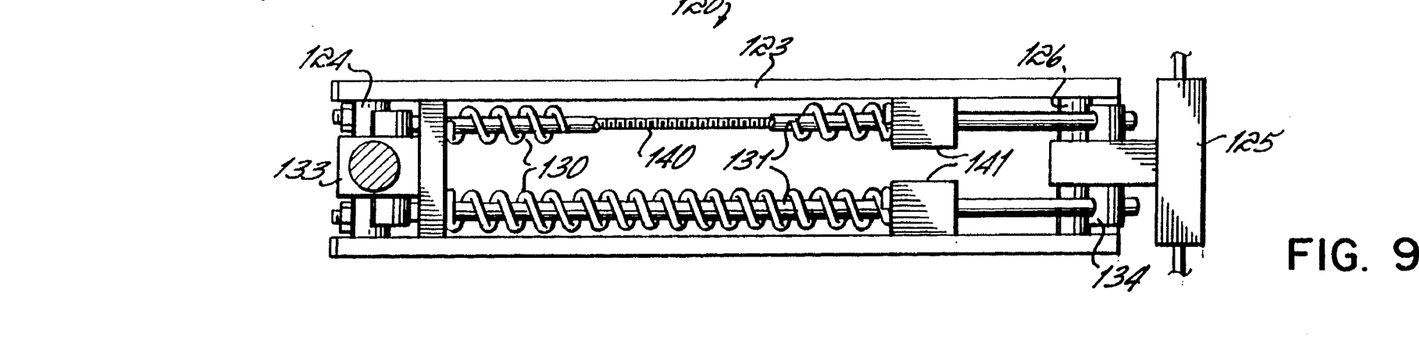
FIG. 9 is a cross-sectional view taken along lines 9—9 of FIG. 8.

Counterbalancing compression springs or other means 130 are mounted on rods 131 pivoted at 132 to the post 133 atone end and at 134 to the bracket 125 at the other end. The rods 131 and arms 123 form a four-bar parallelogram linkage which permits the brackets 125 and the monitor which it carries to be raised and lowered. A screw 140 is connected at one end to the pivot 124 and at the other end to a block 141 against which the end of the compression springs 130 bear. The screw 190 is threaded into the block 141 and can be rotated to change the amount of compression on the springs 130. The compression springs 130 counterbalance the weight of the bracket and monitor 121.

The post 133 is pivotally mounted in a bracket 150 which permits the monitor 121 and arm 123 to swing through an angle of about 220° as shown in FIG. 2, thereby permitting the monitor to be swung to either side of the power column 15.

The monitor itself can swivel on the vertical post 125 to permit optimal viewing by the attendant.

Figures 11, 12:
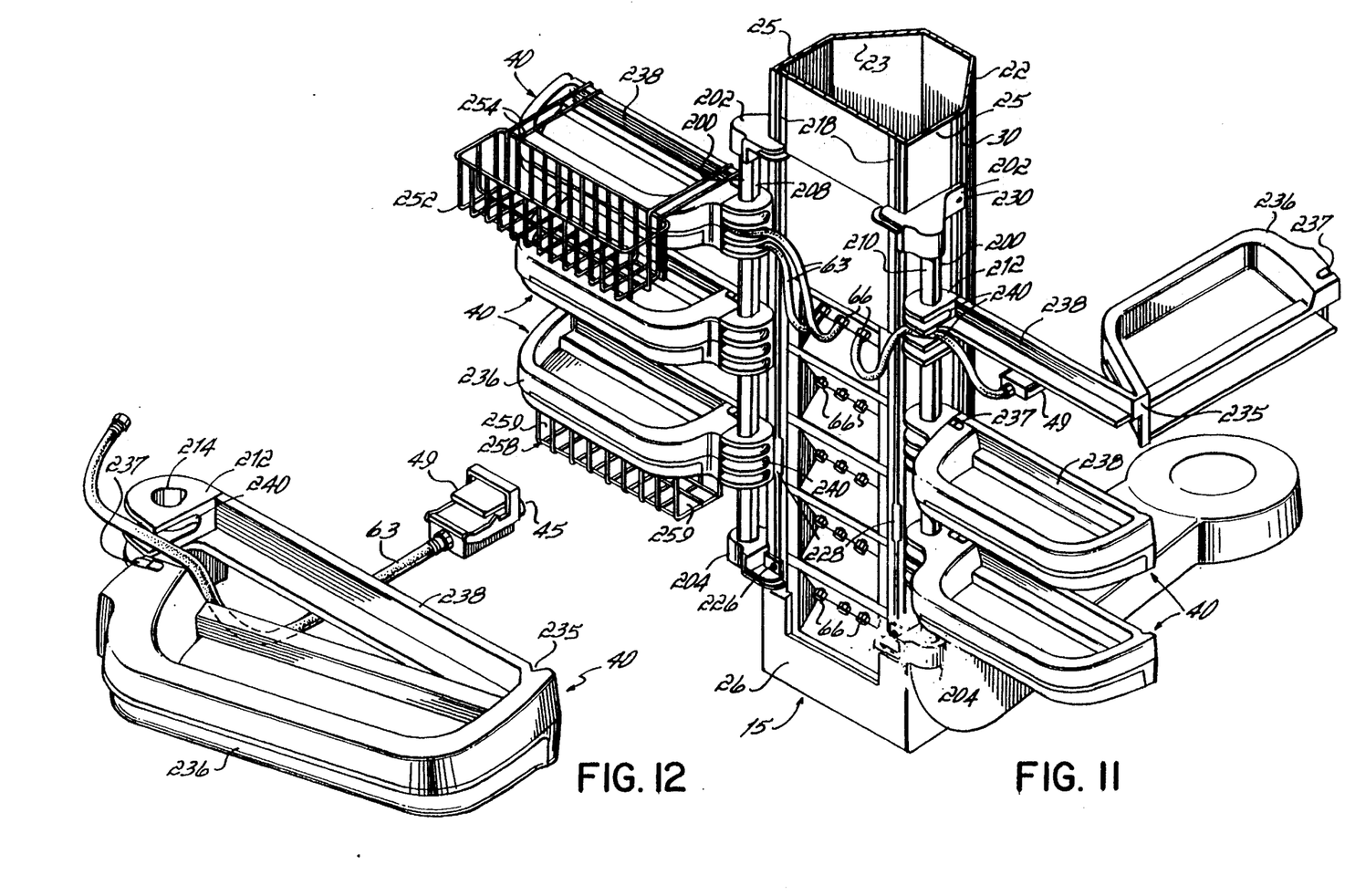
FIG. 11 is a perspective view partially broken away of the back of another embodiment of the power column.
FIG. 12 is a perspective view of the knuckle joint retaining the flexible hose of the invention of FIG. 11.

A second preferred embodiment of the present invention is shown in FIGS. 11–17. The power column 15 includes a vertical pole 200 mounted on each of the side walls 25, 25 (FIG. 11 ). The vertical pole 200 is secured to the power column 15 by an upper and lower mount 202, 204 at the top and bottom end of the pole 200, respectively. Each mount 202, 204 includes a generally circular socket 206 into which circular portions 207 at the top and bottom ends of the pole 200 are seated. The remainder of the length of the pole 200 is non-circular in cross-section having a pair of parallel flat faces 208, 208 joined by a pair of arcuate faces 210, 210. The gas rails 40 include a knuckle-type joint 212 having bore hole 214 through which the pole 200 extends. The bore hole 214 has a complementary shape to engage the parallel flat faces 208,208 and arcuate faces 210, 210 of the pole 200 to thereby prevent rotation of the gas rail 40 relative to the pole 200. However, the pole 200 and attached gas rails 40 can pivot within the sockets 206 of the mounts 202, 204 relative to the power column 15 to provide more convenient access to the accessories by a care provider.

Figure 13:
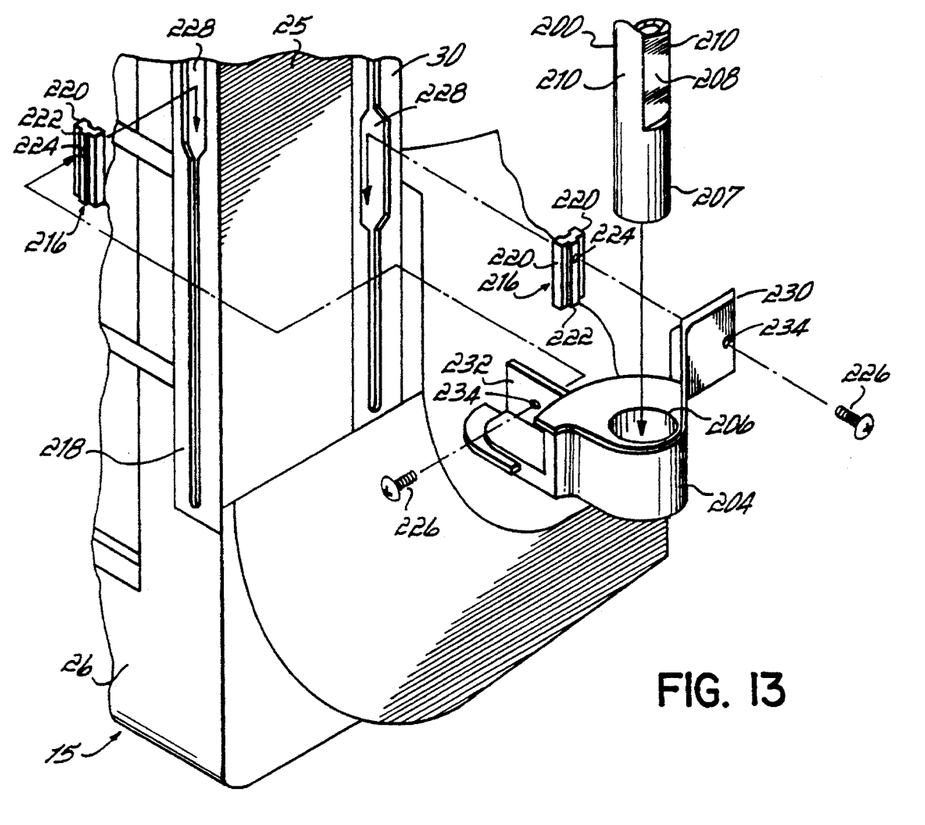
FIG. 13 is an exploded fragmentary perspective view of the lower mount for securing the pole to the power column of FIG. 11.

Each mount 202, 204 is secured to an insert 216 slidably contained within the vertical front rail 30 and a vertical rear rail 218 on the back wall 26 adjacent each side wall 25, 25 as seen in FIG. 13. Each insert 216 has a pair of spaced flanges 220, 220 which are retained within the rails 30, 218 and a center longitudinal ridge 222 which projects between the side walls of the rails 30, 218 when inserted therein. The ridge 222 includes a threaded bore hole 224 to receive a screw 226 therein for securing the respective mount 202, 204 to the insert 21 6. The insert 216 is injected into the respective rail 30, 218 through an enlarged opening 228 in the rail 30, 218.

Each mount 202,204 includes a pair of orthogonal plates 230, 232 with through holes 234 for the insertion of the screw 226 to be threadably secured into the bore hole 224 of the insert 216. The plates 230, 232 are orthogonal in order to correspond to the rails 30, 218 on the orthogonal side and back walls 25, 26 of the power column 15. Once the inserts 216 are in the rails 30, 218 and the mounts 202,204 secured to the inserts 216, the pole 200 and attached gas rails 40 can be re-positioned vertically by securing the inserts 216 and mounts 202, 204 at the appropriate vertical position. Additionally, the gas rails 40 can be repositioned vertically along the length of the pole 200. The gas rails 40 are selectively secured to the pole 200 at the desired position by a set-screw (not shown) which is threadably inserted through a screw hole (not shown) in the knuckle joint 212 on the gas rail 40. The set-screw secures the gas rail 40 to the pole 200 by frictionally engaging the surface of the pole 200 when appropriately advanced through the screw hole.

The gas rails 40 of this preferred embodiment are comprised of a beam 238 joined to a tray 236 by a hinge 235 at the distal end of each gas rail 40 which enables the tray 236 to pivot relative to the beam 238 as shown in FIG. 11. The tray 236 pivots after being released from the channel 238 by the activation of a latch button 237. With the tray 236 pivoted away from the channel 238, the flexible hose 63 is fed into a groove 240 formed in the knuckle-type joint 212 on the proximal end of the gas rail 40 (FIG. 12). The hose 63 is routed from the gas port 66 on the back wall 26 through the groove 240 in the knuckle joint 212 to the inside of the gas rail 40 to be connected to the gas outlet 45 of mounting bracket 49. With the hose 63 seated within the knuckle joint 21 2 the hose 63 pays in and out as required depending upon the pivoting and translational movement of the gas rail 40 relative to the power column 15.

Figure 14:
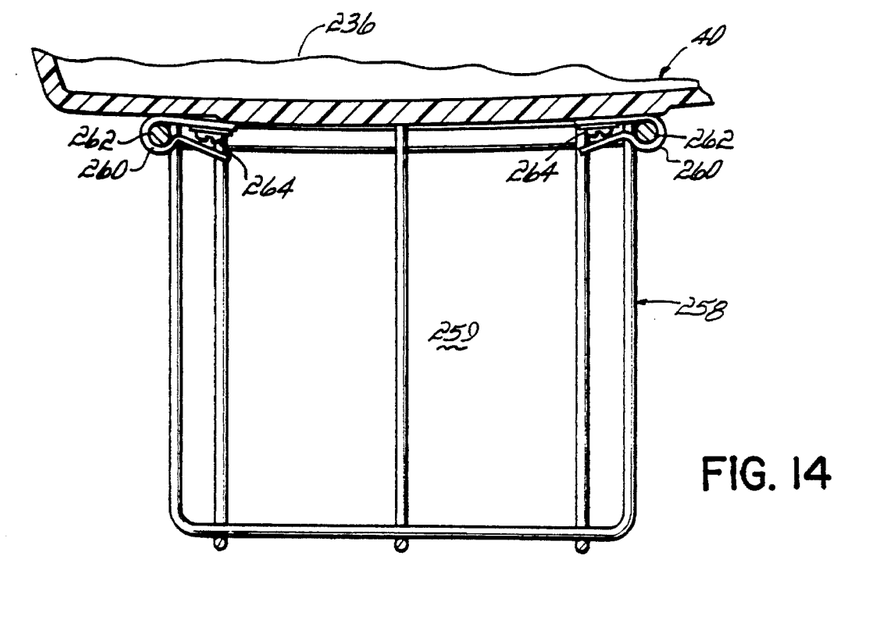
FIG. 14 is a transverse view of a basket on the gas rail.
Figure 15:
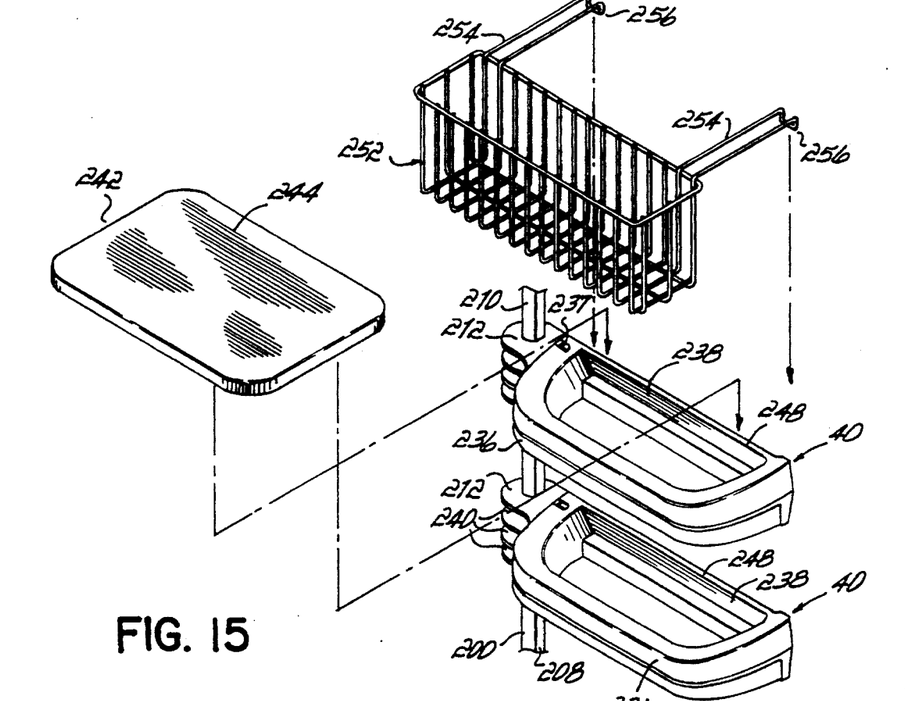
FIG. 15 is an exploded perspective view of a saddle basket and a shelf attached to the gas rail.
Figure 16:
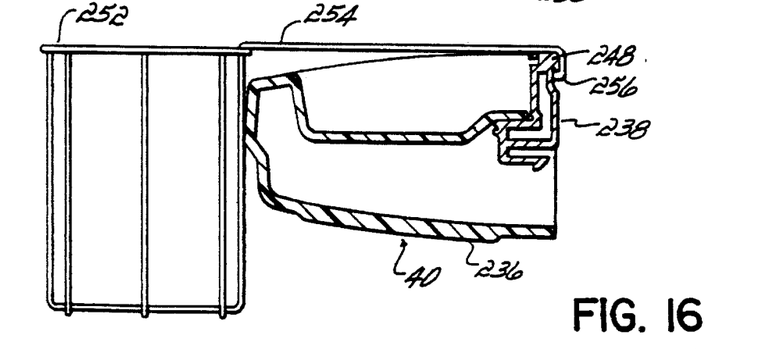
FIG. 16 is a cross-sectional side view of the saddle basket attached to the gas rail.
Figure 17:
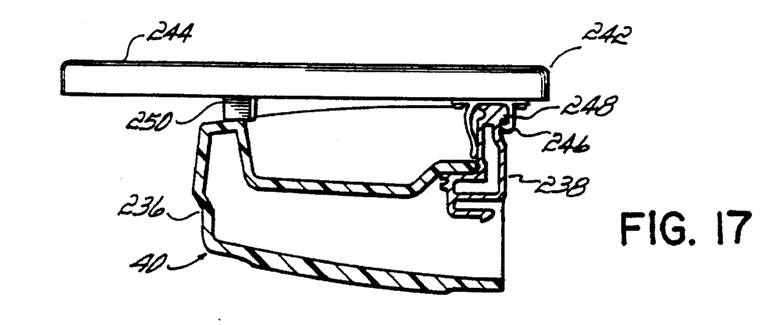
FIG. 17 is a cross-sectional side view of the shelf attached to the gas rail.

Additional accessories are also removably secured to the gas rails 40 of this invention for convenient access as shown in FIGS. 14–17. A shelf 242 with a planar upper surface 244 is clipped onto the channel portion 238 of the gas rail 40 as shown in FIGS. 15 and 17. A bracket 246 is provided on the underside of the shelf 242 to snap-fit or clip onto an upper lip 248 of the gas rail 40. The bracket 246 is clipped onto the lip 248 with the shelf initially inclined relative to the gas rail 40. The shelf 242 is then pivoted toward a horizontal position and a boss 250 on the underside of the shelf 242 rests upon the tray 236 of the gas rail 40 to support and stabilize the shelf 242.

A saddle basket 252 with an open top and a pair of arms 254, 254 extending from the upper edge of the basket 252 can be suspended onto the gas rail 40 as seen in FIGS. 15 and 16. A hook 256 is formed on the distal end of each arm 254 which clips onto the lip 248 on the channel portion 238 of the gas rail 40. The saddle basket 252 is suspended in a cantilever manner over the gas rail 40 with the hooks 256 clipped onto the lip 248 of the channel 238. The saddle basket 252 or shelf 242, however, must be removed from the gas rail 40 during the removal or installation of gas outlets 45 on the gas rail 40.

The final feature of this invention is a storage basket 258 which can be suspended from the bottom side of a gas rail 40 as shown in FIG. 14. Clips 260 are provided on the bottom side of the gas rail 40, preferably on the uppermost gas rail 40 on each pole 200 of the power column 15 in order to ensure adequate clearance between the suspended basket 258 and the subjacent gas rail 40. An upper edge 262 of the basket 258 is snap-fitted between the spaced arms 264 of the clips 260 to suspend the basket 258. The basket 258 includes an open end for access to the interior of the basket 258 when attached to the gas rail 40.

In the operation of the invention, the power column will be positioned either in the L position or in the R position at the left or right corners of the bed 20. Usually the positioning will depend upon the condition of the patient and the location of the instruments that must be connected to the patient. However, in some instances it is positioned in accordance with the convenience of the attending nurse.

Electrical instruments may easily be connected to the electrical outlets on the walls 22 or 23 because the particular wall is directly facing the nurse.

The necessary connections are made to the gas outlets from the hook-ups on the back of the power column. The gas rails may be raised and lowered and they may be pivoted toward and away from the attending nurse as desired. Accessories such as bottles, baskets, and shelves may be mounted on the gas rails and slid from left to right for proper spacing with respect to each other as well as proper spacing with respect to the gas outlets.

Once the power column gas outlets and the like have been properly positioned, the monitor will also be set for the most direct viewing by the attending nurse as she administers to the patient.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

I claim:

1. A power column for a hospital room comprising: an elongated, generally vertical housing having a gas port; an upper arm having one end pivotally mounted on a ceiling of the hospital room and the other end of said upper arm connected to said housing;

a lower arm having one end pivotally mounted on the same axis as said upper arm and on a floor of the hospital room, the other end of said lower arm being connected to said housing;

said upper and lower arms supporting said housing and permitting said housing to swing through an arc that passes from one side of a hospital bed past one end of the bed to the other side of the bed;

at least one gas rail laterally projecting from said housing and being vertically moveable relative to said housing, said gas rail having at least one gas outlet;

a flexible hose connecting said gas outlet to said gas port; and a knuckle joint including at least one groove adapted to permit said hose to be seated within said at least one groove of said knuckle joint, said knuckle joint forming a portion of said at least one gas rail, said knuckle joint thereby enabling said gas rail to be pivoted and vertically moved relative to said housing without undue interference from said hose.

2. A power column for a hospital room comprising:

an elongated, generally vertical housing having a gas port:

an upper arm having one end pivotally mounted on a ceiling of the hospital room and the other end of said upper arm connected to said housing:

a lower arm having one end pivotally mounted on the same axis as said upper arm and on a floor of the hospital room, the other end of said lower arm being connected to said housing;

said upper and lower arms supporting said housing and permitting said housing to swing through an arc that passes from one side of a hospital bed past one end of the bed to the other side of the bed;

at least one gas rail laterally projecting from said housing and being vertically moveable relative to said housing, said gas rail having at least one gas outlet;

a flexible hose connecting said gas outlet to said gas port; and a knuckle joint forming a portion of said at least one gas rail permitting said hose to be seated within a groove of said knuckle joint thereby enabling said gas rail to be pivoted and vertically moved relative to said housing without undue interference from said hose;

said at least one gas rail further including a portion pivotable relative to said knuckle joint portion for opening and closing said joint to facilitate feeding said hose into and through said joint.

3. A power column for a hospital room comprising:

an elongated, generally vertical housing;

an upper arm having one end pivotally mounted on a ceiling of the hospital room and the other end of said upper arm being connected to said housing;

a lower arm having one end pivotally mounted on the same axis as said upper arm and on a floor of the hospital room, the other end of said lower arm being connected to said housing;

said upper and lower arms supporting said housing and permitting said housing to swing through an arc that passes from one side of a hospital bed past one end of the bed to the other side of the bed;

at least one gas rail laterally projecting from said housing;

a shelf mounted atop said gas rail, said shelf providing a convenient support surface for patient-treating accessories to be used by a care provider in administering to a patient situated atop the hospital bed; and means for releasably mounting said shelf to said gas rail.

4. The power column of claim 3 wherein said mounting means comprises a lip on said gas rail and a bracket on an underside of said shelf, said bracket being adapted to releasably snap-fit over said lip, and a boss on said underside of said shelf positioned to rest upon a portion of said gas rail, said boss being spaced from said bracket to stabilize said shelf when said bracket is snap-fitted onto said lip.

5. A power column for a hospital room comprising:

an elongated, generally vertical housing;

an upper arm having one end pivotally mounted on a ceiling of the hospital room and the other end of said upper arm being connected to said housing;

a lower arm having one end pivotally mounted on the same axis as said upper arm and on a floor of the hospital room, the other end of said lower arm being connected to said housing;

said upper and lower arms supporting said housing and permitting said housing to swing through an arc that passes from one side of a hospital bed past one end of the bed to the other side of the bed;

at least one gas rail laterally projecting from said housing;

a basket mounted to said gas rail, said basket providing convenient storage for patient-treating accessories to be used by a care provider in administering to a patient situated atop the hospital bed; and means for releasably mounting said basket to said gas rail.

6. The power column of claim 5 wherein said basket comprises a bottom, four sides connected to said bottom, and an open top, and said mounting means comprises a pair of arms extending from an upper edge of one of said sides, each said arm having a hook formed on a distal end thereof for clipping to a lip on said gas rail.

7. The power column of claim 5 wherein said basket comprises a bottom, three sides connected to said bottom, and an open end, and said mounting means comprises a plurality of clips on an underside of said gas rail, said clips having spaced clip arms adapted to retain a top edge of said basket snap-fitted between said spaced clip arms, said open end of said basket being positioned opposite of said housing when said basket is mounted to said gas rail.

8. A power column for a hospital room comprising:

an elongated, generally vertical housing having gas ports;

an upper arm having one end pivotally mounted on a ceiling of the hospital room and the other end of said upper arm connected to said housing;

a lower arm having one end pivotally mounted on the same axis as said upper arm and on a floor of the hospital room, the other end of said lower arm being connected to said housing;

said upper and lower arms supporting said housing and permitting said housing to swing through an arc that passes from one side of a hospital bed past one end of the bed to the other side of the bed;

at least one gas rail laterally projecting from said housing;

at least on gas outlet mounted on said at least one gas rail;

a flexible hose connecting said at least one gas outlet to one of said gas ports;

said at least one gas rail comprising a beam and a tray, said beam having a first knuckle joint end connected to said housing and a second end to which is pivotally hinged a first end of said tray, and a latch on a second end of said tray for latching said tray second end to said knuckle joint when said tray is pivoted toward said beam, said hose being fed into and through said knuckle joint and said beam and tray of said gas rail and being connected to said gas outlet mounted on said gas rail to thereby protect and allow said hose to pay into and out of said knuckle joint as said gas rail is pivoted and translated relative to said housing.

* * * * *